(12) United States Patent
Donovan et al.

(10) Patent No.: US 7,797,427 B2
(45) Date of Patent: Sep. 14, 2010

(54) SYSTEM AND METHOD FOR APPLYING A COMMUNICATION FEATURE EXTENSION

(75) Inventors: Steven R. Donovan, Plano, TX (US); Aeryung Moon, Warren, NJ (US)

(73) Assignee: Cisco Technology, Inc., San Jose, CA (US)

( * ) Notice: Subject to any disclaimer, the term of this patent is extended or adjusted under 35 U.S.C. 154(b) by 830 days.

(21) Appl. No.: 11/302,302

(22) Filed: Dec. 13, 2005

(65) Prior Publication Data

US 2007/0136461 A1   Jun. 14, 2007

(51) Int. Cl.
*G06F 15/16* (2006.01)
(52) U.S. Cl. .................. 709/227; 709/218; 709/225
(58) Field of Classification Search .......... 709/218, 709/225, 227
See application file for complete search history.

(56) References Cited

U.S. PATENT DOCUMENTS

| | | | |
|---|---|---|---|
| 5,729,599 A | 3/1998 | Plomondon et al. | 379/211 |
| 6,526,137 B1 | 2/2003 | Copley | 379/221.03 |
| 6,584,188 B2 | 6/2003 | Kim | 379/211.02 |
| 6,654,808 B1 * | 11/2003 | Chuah | 709/227 |
| 6,751,309 B2 | 6/2004 | Milton | |
| 6,870,848 B1 | 3/2005 | Prokop | 370/395.2 |
| 7,274,662 B1 * | 9/2007 | Kalmanek et al. | 370/230 |
| 2002/0102999 A1 | 8/2002 | Maggenti et al. | |
| 2002/0141555 A1 | 10/2002 | Kim | 379/142.04 |
| 2004/0121789 A1 * | 6/2004 | Lindsey | 455/517 |
| 2005/0053218 A1 | 3/2005 | Kim | 379/211.02 |
| 2005/0074017 A1 | 4/2005 | Qian et al. | 370/401 |
| 2005/0216421 A1 * | 9/2005 | Barry et al. | 705/64 |
| 2006/0123122 A1 * | 6/2006 | Jung et al. | 709/227 |
| 2006/0245429 A1 * | 11/2006 | Luong et al. | 370/394 |

\* cited by examiner

*Primary Examiner*—William C Vaughn, Jr.
*Assistant Examiner*—Boris Gorney
(74) *Attorney, Agent, or Firm*—Baker Botts L.L.P.

(57) ABSTRACT

A system and method for applying a communication feature extension includes facilitating an exchange of requests between an originating endpoint and a terminating endpoint using a first identifier associated with the originating endpoint and a second identifier associated with the terminating endpoint. A modified request is received during the exchange. The modified request includes a new identifier representing a selected one of a modified first identifier and a modified second identifier, and an extension providing information about handling the modified request. The extension included in the modified request is determined and applied.

21 Claims, 3 Drawing Sheets

SYSTEM AND METHOD FOR APPLYING A COMMUNICATION FEATURE EXTENSION

TECHNICAL FIELD OF THE INVENTION

This invention relates generally to the field of communications and more specifically to a system and method for applying a communication feature extension.

BACKGROUND

Networks and network elements facilitate communication sessions between endpoints by exchanging requests between the endpoints. Within the networks, a call routing layer exists to route the requests and an application layer exists to deploy communication features on behalf of the endpoints. When the application layer executes a communication feature on behalf of an endpoint, there are multiple actions that the application layer may need the call routing layer to take based on the executed communication feature. Existing mechanisms assume that a change in the destination of the request should be treated as an instance of a call forwarding feature. However, this is not always the case. The lack of interaction between the call routing layer and the application layer is not desirable for such features as call forwarding, find-me, virtual number, or other features that result in the destination of the service request being changed.

SUMMARY OF THE DISCLOSURE

From the foregoing, it may be appreciated by those skilled in the art that a need has arisen for an improved system and method to allow interaction between the application layer and the call routing layer. In accordance with the present invention, disadvantages and problems associated with conventional systems and methods to apply communication features may be reduced or eliminated.

According to one embodiment of the present invention, a system and method for applying a communication feature extension includes facilitating an exchange of requests between an originating endpoint and a terminating endpoint using a first identifier associated with the originating endpoint and a second identifier associated with the terminating endpoint. A modified request is received during the exchange. The modified request includes a new identifier representing a selected one of a modified first identifier and a modified second identifier, and an extension providing information about handling the modified request. The extension included in the modified request is determined and applied.

Certain embodiments of the invention may provide one or more technical advantages. A technical advantage of one embodiment includes providing for the interaction between the application layer and the call routing layer of a network. The interaction between the application and call routing layers allows the call routing layer to determine how to handle a request based on the executed feature. For example, if a network element implementing call routing receives a new identifier of an endpoint from a network element invoking communication features, the call routing element may determine how to handle the new identifier based on the communication feature extension. Another technical advantage of an embodiment includes differentiating between applications that change the actual destination of the request and applications that route the request to the same destination using a different address, phone number, or name. For example, a call forwarding application routes the request to a different destination; whereas, a virtual number application routes the request to the same destination using a different address, phone number, or name.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, wherein like reference numerals represent like parts, in which.

DETAILED DESCRIPTION OF THE DRAWINGS

Figure 1:
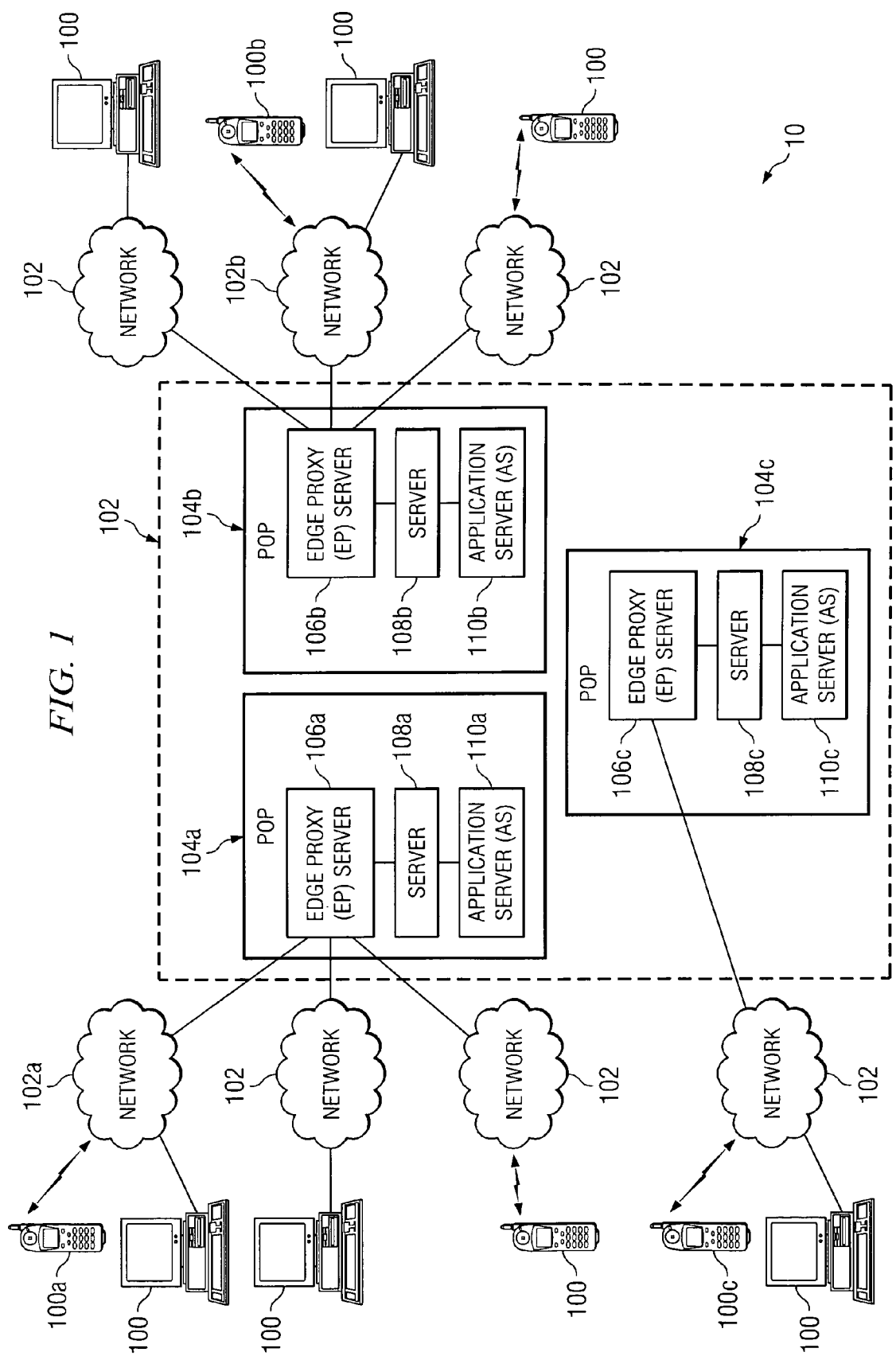
FIG. 1 illustrates an embodiment of a system that provides for the application of a communication feature extension.

FIG. 1 illustrates an embodiment of a system 10 that provides for the application of a communication feature extension. System 10 includes network elements, such as servers 106, 108, and 110, that route signaling or control requests of endpoints 100.

The requests include any suitable information, such as a header, which includes an identifier and an extension, or a phase of the session. The identifier identifies endpoint 100 in any suitable form, such as a Request Uniform Resource Identifier (Request-URI) associated with a called party, a P-Asserted-Identity associated with a calling party, or a Diversion Header URI associated with a party forwarding a call. The extension includes a token that provides instructions to network elements. The identifier may be modified during any phase of the communication session, and the extension instructs the network elements how to handle the modified identifier.

The phase of the session represents a particular exchange during the communication session. The phase may include an originating phase, a terminating phase, a call-forward-originating phase, a terminating-registered phase, or a terminating-unregistered phase. The originating phase involves authorization and execution of features associated with a calling party. The call-forward-originating phase occurs with a call forward feature. This phase involves authorization and execution of features associated with the forwarding party, which was the called party in the original request. The terminating phase involves authorization and execution of features associated with the called party. This phase can be divided into terminating-registered and terminating-unregistered phases. The terminating-registered phase is for terminating endpoint 100 that is currently registered with network 102. Once the features are executed, the request is expected to be routed to any registered contacts. The terminating-unregistered phase is for terminating endpoint 100 that is not currently registered with network 102. Call forwarding can be invoked as a feature in this phase.

During each phase of the communication session, the network elements provide a particular service to endpoints 100 that corresponds to the phase of the session. For example, network elements provide an originating service to endpoints 100 during the originating phase. By routing the requests, a communication session between endpoints 100 is facilitated.

Endpoints 100 exchange audio, voice, data, video, or other information in system 10. To control the exchange of the information, endpoints 100 send signaling or any suitable control requests within system 10 to establish communication with other endpoints 100. Furthermore, the requests may be in any suitable communication protocol, such as Session Initiation Protocol (SIP) or Internet Protocol (IP) Multimedia System (IMS). Endpoints 100 may be any combination of hardware and/or software that provide communication services to a user. Endpoints 100 may include analog, digital, or Internet Protocol (IP) telephones, a cellular phone, a wireless fidelity (Wi-Fi) phone, a personal computer with a telephony application, a personal digital assistant, or any other suitable communication device. Each endpoint 100 has an associated identifier, such as a number, address, and/or a name. The identifier of any suitable endpoint 100 may be modified during any suitable phase of the communication session. For example, the P-Asserted Identity of originating endpoint 100 may be modified during the originating phase. As another example, the Request-URI of terminating endpoint 100 may be modified during the terminating phase. In an embodiment, endpoint 100 has multiple associated numbers, addresses, and/or names. For example, originating endpoint 100 sends a request to terminating endpoint 100 using a virtual number as the original identifier and the identifier is modified to reflect the real number of terminating endpoint 100.

Networks 102 facilitate the communication between endpoints 100. Networks 102 may include a public switched telephone network (PSTN), a local area network (LAN), a wide area network (WAN), a Wi-Fi network, any other public or private data network, a local, regional, or global communication network such as the Internet, an enterprise intranet, other suitable wireline or wireless communication link, or any suitable combination of the preceding. Networks 102 may include any combination of gateways, routers, hubs, switches, access points, base stations, and any other hardware and/or software that may implement any suitable protocol or communication.

Network elements are included in a Point of Presence (PoP) 104. PoP 104 contains any suitable combination of network elements and may interact with other PoPs 104. Each endpoint 100 may be assigned to a particular PoP 104. For example, endpoint 100a is associated with PoP 104a, endpoint 100b is associated with PoP 104b, and endpoint 100c is associated with PoP 104c.

In the illustrated embodiment, each PoP 104 includes servers 106, 108, and 110. Each server 106, 108, and 110 may represent a logical entity that transmits requests, messages, or other communication. The logic of servers 106, 108, and 110 may be embodied in a computer readable medium. Servers 106, 108, and 110 may handle any suitable number of requests at any suitable rate, and may support requests in any suitable communication protocol.

Servers 106 participate in routing requests from an endpoint 100 that originates a request (originating endpoint 100) to an endpoint 100 that receives the requests (terminating endpoint 100). In the illustrated embodiment, servers 106 are edge proxy servers that are entry and exit points for requests of endpoints 100. Servers 106 may also support signaling compression, authentication and identity assertion, protocol adaptation, Network Address Translation/Firewall (NAT/FW) translation for signaling, and other functions to allow seamless interoperability between multiple access locations and core network services and elements.

Servers 108 also participate in routing requests from an originating endpoint 100 to a terminating endpoint 100. In addition to routing requests, servers 108 may provide authentication, authorization, registration, service selection, interaction, and invocation, access to and management of service and endpoint 100 data, presence, or Simple Traversal of User Datagram Protocol (UDP) through Network Address Translators (NATs)(STUN) functionality.

Server 110 is a network element that operates as an application server and executes features or applications on behalf of endpoints 100. In an embodiment, server 110 provides basic communication functions necessary for services in an all-IP environment. Depending on the application, server 110 may function in different modes, such as a user agent server (UAS), a user agent client (UAC), as a proxy, or as a B2BUA. In the UAS mode, server 110 may decide to terminate a request by generating a final response. Server 110 follows the UA rules specified in Internet Engineering Task Force (IETF) Request for Comments (RFC) 3261 in this mode. In the UAC mode, server 110 acts as a UA as specified in IETF RFC 3261 and generates requests to server 108, and server 108 proxies the request to terminating endpoint 100. In the proxy mode, server 110 proxies requests received from server 108. Server 110 implements proxy behavior as specified in IETF RFC 3261. In the B2BUA mode, server 110 receives a request from server 108 and generates a new request to server 108 based on the received request. The new request is for a different dialog. In this mode of operation, server 110 behaves as a B2BUA for multiple dialogs as specified in IETF RFC 3261. Applications within server 110 determine what mode to place server 110 into based on the communication session type and the context of the request. For example, server 110 may behave as a UAS, a proxy, or a B2BUA depending on the request from originating endpoint 100.

In operation, an originating endpoint 100a sends a request through network 102a to PoP 104a, which initiates an originating phase of the communication session. During the originating phase, the network elements provide the originating service to originating endpoint 100a. Server 106a initially receives the request and proxies the request to server 108a, and server 108a determines how to proceed with the request. Server 108a consults a service profile associated with originating endpoint 100a to make the determination. For example, server 108a may determine it needs to proxy the request to server 110a, which is also associated with originating endpoint 100a. Server 110a processes the request according to its particular mode. For example, if server 110a is in proxy mode, server 110a invokes the appropriate feature based on the phase of the session and proxies the request back to server 108a upon processing the request. Server 108a proxies the request to server 108b associated with terminating endpoint 100b, which begins the terminating phase and corresponding terminating service of the session.

Server 108b consults a service profile associated with terminating endpoint 100b to determine how to proceed with the request. For example, server 108b may determine that it needs to proxy the request to server 110b. Server 108b proxies the request to server 110b, and server 110b invokes the appropriate feature. If server 110b behaves as a proxy server, server 110b completes processing the request and proxies the request back to server 108b. Once server 108b completes providing the terminating service for terminating endpoint 100b, server 108b begins contact routing and proxies the request to server 106b, which is associated with terminating endpoint 100b. Server 106b proxies the request to terminating endpoint 100b and a session can be established between originating endpoint 100a and terminating endpoint 100b.

During the establishment of the communication session, in any phase, servers 110 may return a request to server 108 that contains a different identifier in the header. For example, if terminating endpoint 100 forwards a request to another endpoint 100, the identifier is changed in the request. As another example, if terminating endpoint 100 has several associated numbers, names, and/or addresses, the request may be sent to an address instead of the number included in the original request. As yet another example, the identifier may be modified during the originating service, such as in an emergency call. For example, server 108 sends a request to server 110 during an originating service with the P-Asserted-Identify identifying originating endpoint 100. The P-Asserted-Identity is updated with an Emergency Service Query Key (ESQK), which identifies a call instance at server 110 and is used to look up location information. Conventionally, upon receiving the new identifier, server 108 would discontinue servicing the previous identifier and begin servicing the new identifier. Server 108 would receive the request and begin servicing endpoint 100 or invoking inappropriate features. This behavior may not be desirable in a call-forwarding situation, a virtual number situation, or in a click-to-dial case.

In an embodiment, when server 110 proxies the new identifier to server 108, an extension is also included in the header that instructs server 108 on handling the new identifier. The extension may include any suitable token, such as a skip token or a continue token. The token is the instruction that server 108 follows in handling the new identifier. For example, when the identifier of originating endpoint 100 is modified, the skip token instructs server 108 to stop the originating service for originating endpoint 100 and start the terminating service for terminating endpoint 100. Continuing with the emergency call example from above, following modification of the identifier, server 110 proxies the request back to server 108 with the skip token that indicates how to handle the remainder of the originating service and routes the call to terminating endpoint 100. As another example, when the identifier of terminating endpoint 100 is modified, the skip token instructs server 108 to stop the terminating service and start contact routing for the new identifier. As yet another example, in the originating phase, the continue token instructs server 108 to continue with the current originating service. In an embodiment, this behavior occurs when the original and new identifier share the same service profile. As a further example, the continue token in the terminating phase instructs server 108 to continue the terminating service for terminating endpoint 100. In an embodiment, this behavior occurs when the original and new identifier share the same service profile. In an embodiment, server 108 may remove the extension from the modified request.

Modifications, additions, or omissions may be made to system 10 without departing from the scope of the invention. For example, system 10 may include any suitable number of servers 106, 108, and 110 that facilitate the communication between endpoints 100. As another example, endpoints 100 may use any suitable network element to establish a communication session and the element may be used in any suitable manner. Additionally, operations in system 10 may be performed using any suitable logic.

Figure 2:
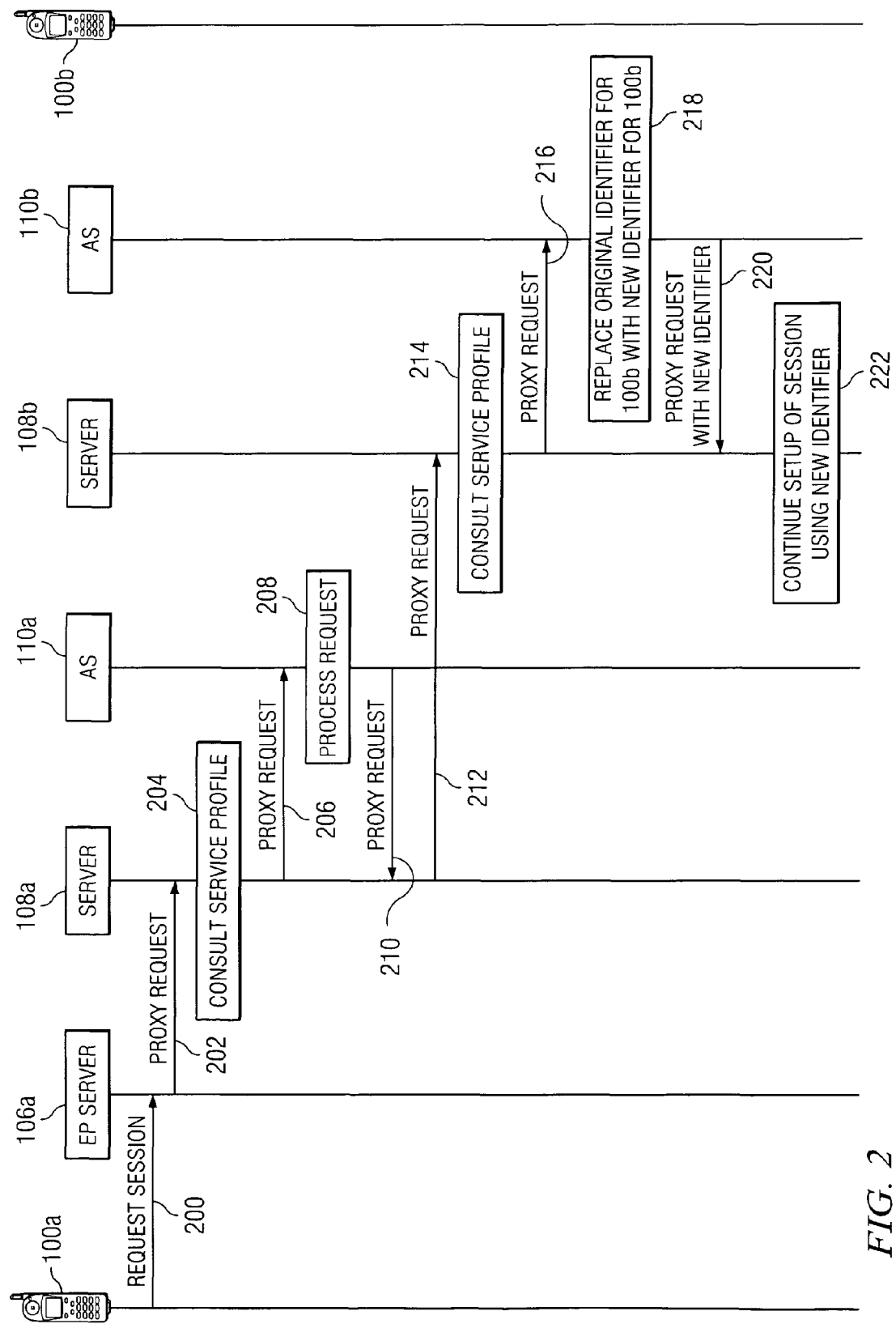
FIG. 2 is a call flow diagram illustrating an embodiment of applying the communication feature extension in a terminating service.

FIG. 2 is a call flow diagram illustrating an embodiment of applying the communication feature extension in a terminating service. Originating endpoint 100a attempts to establish a communication session with terminating endpoint 100b. The request for the session includes an original identifier for terminating endpoint 100b, such as a virtual number. As an example, the virtual number is replaced with a real number, which is the new identifier. The network elements operate to setup the communication session between originating endpoint 100a and terminating endpoint 100b using the original and new identifiers.

At message 200, endpoint 100a sends a request to server 106a to begin a communication session with terminating endpoint 100b. Server 106a proxies the session request to server 108a. Server 108a consults the service profile of originating endpoint 100a at instance 204 to determine how to proceed with the request. Based on the information in the service profile, server 108a proxies the session request to server 110a at message 206. Server 110a processes the request at instance 208. In the illustrated embodiment, server 110a is in proxy mode and processes the request accordingly. At message 210, server 110a proxies the session request back to server 108a, and server 108a proxies the request to server 108b associated with terminating endpoint 100b at message 212. Server 108b consults the service profile of terminating endpoint 100b at instance 214. Based on the information in the service profile, server 108b proxies the session request to server 110b at message 216.

In the illustrated embodiment, server 110b replaces the original identifier of terminating endpoint 100b with the new identifier of terminating endpoint 100b at instance 218. For example, server 110b replaces the virtual number with a real number or a virtual number with an IP address. When server 110b changes the identifier, it also generates an extension and includes the extension in the header of the request. In the illustrated embodiment, the extension includes a continue token. Server 110b proxies the request with the new identifier and extension to server 108b at message 220. Because the extension includes a continue token, server 108b continues the terminating session for terminating endpoint 100b using the new identifier. The call flow continues at step 222 with the setup of a communication session with endpoint 100b by routing the request to an edge proxy server associated with terminating endpoint 100b and eventually to terminating endpoint 100b.

Figure 3:
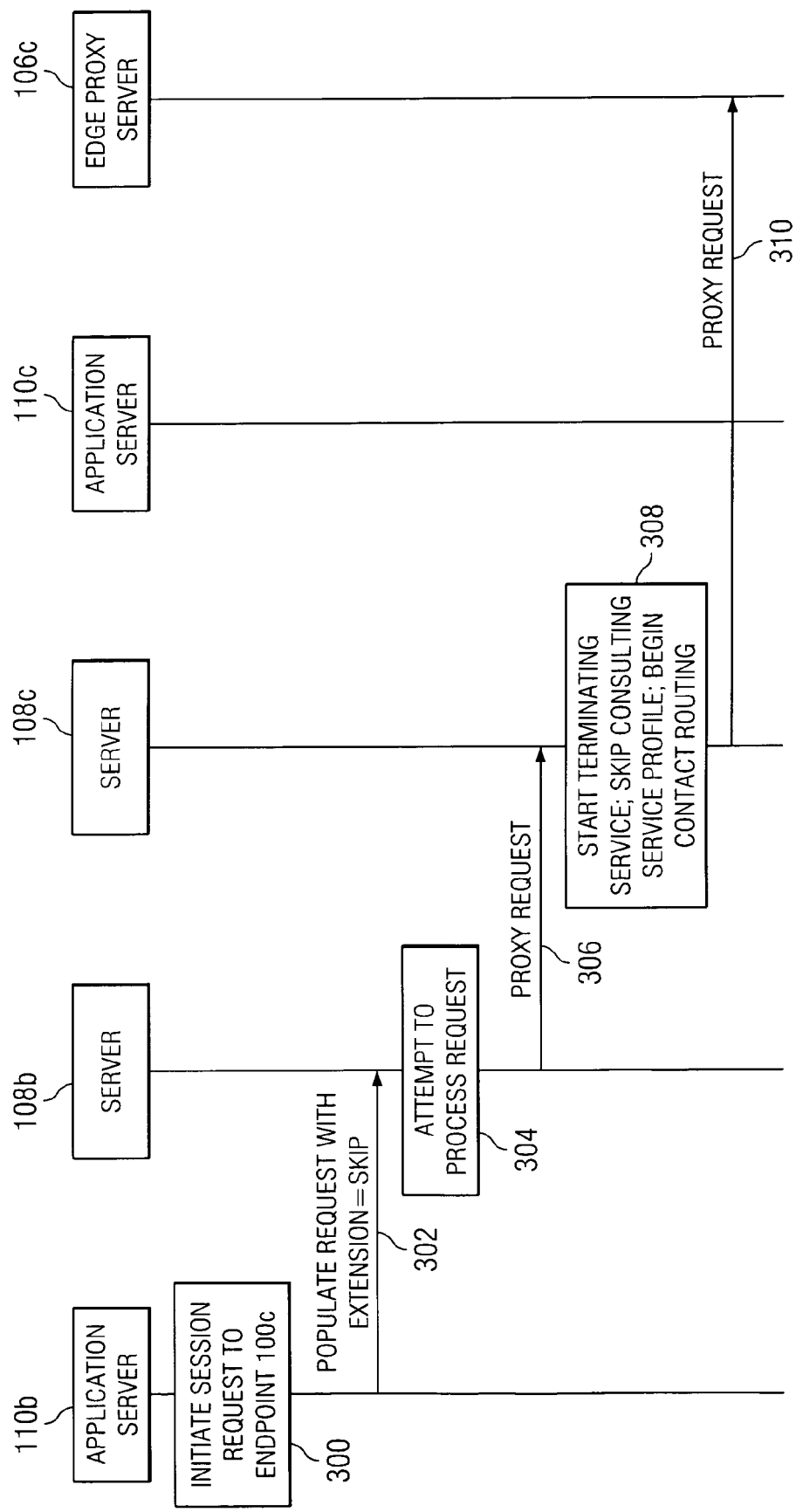
FIG. 3 is a call flow diagram illustrating another embodiment of applying the communication feature extension in a terminating service.

FIG. 3 is a call flow diagram illustrating another embodiment of applying the communication feature extension in a terminating service. In a click-to-dial situation, an application initiates a request for a communication session instead of an endpoint 100. Server 108 associated with terminating endpoint 100 processes the request. The call flow diagram illustrates an example of the request being proxied to the wrong server 108 before reaching the correct server 108 to process the request.

At instance 300, server 110b initiates a request to establish a session with terminating endpoint 100c at instance 300. For example, in a click-to-dial situation, a user clicks a link on a website and the application initiates the session request. At message 302, server 110b populates the session request with an extension having a skip token and proxies the request to server 108b for terminating service for the initiator. Server 108b attempts to process the request at instance 304; however, server 108b determines that the identifier in the request is not associated with PoP 104b. Therefore, server 108b proxies the request to server 108c at message 306. Server 108c is responsible for providing terminating service for terminating endpoint 100c, and is in PoP 104c associated with terminating endpoint 100c. At instance 308, server 108c starts terminating services for endpoint 100c, skips consulting the service profile because of the skip token in the extension, and begins contact routing for endpoint 100c. Server 108c proxies the request to server 106c at message 310, and the setup of the communication session with terminating endpoint 100c continues.

The call flow diagrams are only exemplary illustrations. For example, server 108 may operate in another mode, which causes the call flow diagram to change accordingly. Modifications, additions, or omissions may be made to the call flow diagrams. In addition, messages and instances may be performed in any suitable manner.

While this disclosure has been described in terms of certain embodiments and generally associated methods, alterations and permutations of the embodiment and methods will be apparent to those skilled in the art. Accordingly, the above description of example embodiments does not constrain this disclosure. Other changes, substitutions, and alterations are also possible without departing from the scope and spirit of this disclosure.

What is claimed is:

1. A method for applying a communication feature extension, comprising:
   facilitating an exchange of requests between an originating endpoint and a terminating endpoint using a first identifier associated with the originating endpoint and a second identifier associated with the terminating endpoint;
   receiving a modified request during the exchange, wherein the modified request includes:
      a new identifier representing a selected one of a modified first identifier and a modified second identifier, wherein the first identifier and the second identifier are modified during a phase of a communication session, the phase represents a particular exchange during the communication session, and the phase includes a selected one of an originating phase, a terminating phase, a call-forward-originating phase, a terminating-registered phase, and a terminating-unregistered phase;
      an extension providing information about handling the modified request, wherein the extension includes a selected one of a continue token and a skip token, the continue token includes instructions to continue the phase of the communication session, and the skip token includes instructions to terminate the phase of the communication session and initiate a second phase of the communication session;
   determining the extension included in the modified request; and
   applying the extension according to the phase.

2. The method of claim 1, further comprising receiving a request from a network element, wherein the request is initiated by the network element.

3. The method of claim 1, further comprising removing the selected one of the continue token and the skip token from the modified request.

4. The method of claim 1, wherein the extension includes the continue token, further comprising:
   continuing a current phase of the exchange;
   using the new identifier during the current phase.

5. The method of claim 1, wherein the extension includes the skip token, further comprising terminating a current phase of the exchange.

6. The method of claim 5, wherein the current phase is the originating phase, further comprising beginning the terminating phase of the exchange.

7. The method of claim 5, wherein the current phase is the terminating phase, further comprising beginning contact routing for the new identifier.

8. A non-transitory computer readable medium including logic for applying a communication feature extension, the logic operable, when executed, to:
   facilitate an exchange of requests between an originating endpoint and a terminating endpoint using a first identifier associated with the originating endpoint and a second identifier associated with the terminating endpoint;
   receive a modified request during the exchange, wherein the modified request includes:
      a new identifier representing a selected one of a modified first identifier and a modified second identifier, wherein the first identifier and the second identifier are modified during a phase of a communication session, the phase represents a particular exchange during the communication session, and the phase includes a selected one of an originating phase, a terminating phase, a call-forward-originating phase, a terminating-registered phase, and a terminating-unregistered phase;
      an extension providing information about handling the modified request, wherein the extension includes a selected one of a continue token and a skip token, the continue token includes instructions to continue the phase of the communication session, and the skip token includes instructions to terminate the phase of the communication session and initiate a second phase of the communication session;
   determine the extension included in the modified request; and
   apply the extension according to the phase.

9. The non-transitory computer readable storage medium of claim 8, the logic further operable to receive a request from a network element, wherein the request is initiated by the network element.

10. The non-transitory computer readable storage medium of claim 8, the logic further operable to remove the selected one of the continue token and the skip token from the modified request.

11. The non-transitory computer readable medium of claim 8, wherein the extension includes the continue token, the logic further operable to:
   continue a current phase of the exchange;
   use the new identifier during the current phase.

12. The non-transitory computer readable medium of claim 8, wherein the extension includes the skip token, the logic further operable to terminate a current phase of the exchange.

13. The non-transitory computer readable medium of claim 12, wherein the current phase is the originating phase, the logic further operable to begin the terminating phase of the exchange.

14. The non-transitory computer readable storage medium of claim 12, wherein the current phase is the terminating phase, the logic further operable to begin contact routing for the new identifier.

15. A system for applying a communication feature extension, comprising:
   an originating endpoint comprising a processor and a terminating endpoint comprising a processor, the originating endpoint and the terminating endpoint operable to exchange requests, a first identifier associated with the originating endpoint and a second identifier associated with the terminating endpoint;
   a server operable to:
      receive a modified request during the exchange, wherein the modified request includes:
         a new identifier representing a selected one of a modified first identifier and a modified second identifier, wherein the first identifier and the second identifier are modified during a phase of a communication session, the phase represents a particular exchange during the communication session, and the phase includes a selected one of an originating phase, a terminating phase, a call-forward-originating phase, a terminating-registered phase, and a terminating-unregistered phase;

an extension providing information about handling the modified request, wherein the extension includes a selected one of a continue token and a skip token, the continue token includes instructions to continue the phase of the communication session, and the skip token includes instructions to terminate the phase of the communication session and initiate a second phase of the communication session;

determine the extension included in the modified request; and apply the extension according to the phase.

16. The system of claim 15, the server further operable to receive a request from a network element, wherein the request is initiated by the network element.

17. The system of claim 15, the server further operable to remove the selected one of the continue token and the skip token from the modified request.

18. The system of claim 15, wherein the extension includes the continue token, the server further operable to:

continue a current phase of the exchange;

use the new identifier during the current phase.

19. The system of claim 15, wherein the extension includes the skip token, the server further operable to terminate a current phase of the exchange.

20. The system of claim 19, wherein the current phase is the originating phase, the server further operable to begin the terminating phase of the exchange.

21. The system of claim 19, wherein the current phase is the terminating phase, the server further operable to begin contact routing for the new identifier.

* * * * *